United States Patent [19]

Becker et al.

[11] Patent Number: 4,987,163

[45] Date of Patent: Jan. 22, 1991

[54] STABLE AQUEOUS EPOXY RESIN DISPERSION, PROCESS FOR THE PREPARATION THEREOF AND USE THEREOF

[75] Inventors: Wilhelm Becker, Hamburg; Claus Godau, Kiedrich; Dieter Dreischhoff, Wiesbaden, all of Fed. Rep. of Germany

[73] Assignee: Hoechst AG, Fed. Rep. of Germany

[21] Appl. No.: 365,545

[22] Filed: Jun. 13, 1989

[30] Foreign Application Priority Data

Jun. 15, 1988 [DE]  Fed. Rep. of Germany ....... 3820301

[51] Int. Cl.$^5$ .............................................. C08L 63/00
[52] U.S. Cl. .................................... 523/414; 523/402; 523/415; 523/420
[58] Field of Search ................ 523/402, 414, 420, 415

[56] References Cited

U.S. PATENT DOCUMENTS

| | | | |
|---|---|---|---|
| 4,315,044 | 2/1982 | Elmore et al. | 523/402 |
| 4,415,682 | 11/1983 | Becker | 523/402 |
| 4,446,260 | 5/1984 | Woods et al. | 523/414 |

FOREIGN PATENT DOCUMENTS 0159858  10/1982  Japan .................................... 523/415

*Primary Examiner*—Paul R. Michl
*Assistant Examiner*—U. K. Rajguru

*Attorney, Agent, or Firm*—Bierman and Muserlian

[57] ABSTRACT

The invention relates to a stable epoxy resin dispersions and also a process for the preparation thereof and the use thereof, in particular for coatings. The epoxy resin dispersions which are remarkable, in particular, for good storage stability with a low content of organic solvents at the same time and little tendency to skin formation and yield coatings with good surface properties, contain, in addition to water, optionally small quantities of organic solvents and also optionally usual additives, as an essential constituent a condensation product of (a) 50 to 80% by weight of an epoxy compound containing at least two epoxy groups per molecule and having an epoxy equivalent to of 100 to 2,000.
(b) 35 to 17% by weight of an aromatic polyol and
(c) 15 to 3% by weight of a condensation product of an aliphatic polyol with a molecular weight (Mw) of 200 to 20,000, an epoxy compound containing at least two epoxy groups per molecule and having an epoxy equivalent of 100 to 2,000, and of a mono- and/or polyisocyanate, the equivalent ratio of the OH groups to the epoxy groups being 1:0.85 to 1:3.5, the quantity of mono- and/or polyisocyanate being 0.05 to 5% by weight, referred to the quantity of aliphatic polyol and epoxy compound, and the epoxy equivalent of said condensation product being between 200 and at least 50,000.

27 Claims, No Drawings

STABLE AQUEOUS EPOXY RESIN DISPERSION, PROCESS FOR THE PREPARATION THEREOF AND USE THEREOF

It is known that synthetic resins are prepared by emulsion polymerisation and stable aqueous dispersion of said resins are produced by adding the solid resin and a suitable dispersant to water while stirring. In the case of condensates such as epoxy resins aqueous dispersions must, however, be prepared by dispersing the solid resin in water. Such dispersions are in general fairly unstable and settle even in the course of a short time. They also generally exhibit fairly poor film-forming properties. These disadvantages, namely low stability of the dispersion and poor film properties, are mainly due to the large particle size of the resin.

The preparation of coating compounds based on polyepoxide dispersions is disclosed in the U.S. Pat. No. 3,772,228, according to which a hot-curing single-component coating compound is produced by grinding and dispersing a solid brittle polyepoxide, a solid brittle epoxy hardener, for example a polyanhydride, and also optionally an epoxide curing accelerator in a liquid which is not a solvent for the various components. In this connection, aliphatic hydrocarbons are preferred. In this manner, epoxy resin dispersions are obtained which are not, however, aqueous and which entail the risks inherent in the use of hydrocarbon solvents.

The preparation of stable aqueous, organic-solvent-free dispersions of epoxy resins of relatively low molecular weight (200 to 4,000, preferably 240 to 1,300) with mean particle sizes of less than about 10 μm using anion-active nonionogenic, preferably, however, cation-active dispersants is also known (U.S. Pat. No. 3,879,324). In this case, the epoxy resin is heated to form a melt, mixed with water and the dispersant and then passed through a colloid mill. Only those epoxy resins with the specified molecular weight which melt below 100° C., the boiling point of water, can be dispersed by this process. This strict limitation has the disadvantage that it excludes numerous useful epoxy resin systems of high molecular weight. Apart from that, dispersion at the boiling point of water still yields relatively large particles which rapidly sediment.

The preparation of epoxy solid resins which can also be obtained immediately in the form of an aqueous dispersion has also already been described (U.S. Pat. No. 4,122,067). In that case block polymers composed of ethylene oxide and polypropylene glycol or polymers composed of polyethylene glycols with a molecular weight of 2,000 to 20,000 and polyglycidyl ethers of polyphenols with a molecular weight of 300 to 2,000 in a molar ratio of 2:1 to 6:5 are employed as dispersant. By this process, too, only dispersions with a particle size of 1 to 3 μm are obtained.

According to the European Patent No. 81,163, polyalkylene glycol derivatives are employed as nonionic dispersants for stable aqueous epoxy resin dispersions, mean particle sizes of less than 1 μm being possible. The coatings obtainable with these dispersions are still not, however, fully satisfactory in a number of properties.

According to European Published Specification No. 0,051,483, epoxy resin dispersions are obtained from self-emulsifying epoxy resins which contain polyoxyalkylene glycol glycidyl ether and optionally also a monoepoxide as reactive thinner. Approx. 3 μm is specified as maximum particle size. Films which are prepared from these dispersions and hardeners have a relatively soft surface due to the content of polyoxyalkylene glycol glycidyl ethers, which are very inert, and optionally monoepoxides which act as chain stoppers.

According to U.S. Pat. No. 4,399,242, the epoxy resin is reacted with a diisocyanate at approx. 120° C. before it is mixed with a diglycidyl ether of an ethylene oxide and propylene oxide block polymer as emulsifier to be incorporated and is dispersed with water. The size of the dispersed particles are also in the order of magnitude of 1 to 3 μm. The film formation is unsatisfactory.

The earlier European Patent Application No. 87.118,640.9 has already proposed an aqueous dispersion based on a special self-emulsifying epoxy resin which has good storage stability accompanied at the same time by a low content of organic solvents and produces coatings with good surface properties. However, under certain circumstances, this dispersion has a tendency to skin formation.

The invention now relates to an aqueous dispersion based on a self-emulsifying epoxy resin A), the dispersion containing, in addition to water B), optionally up to 15 % by weight, referred to the total dispersion, of organic solvents C) and optionally normal additives D), wherein the self-emulsifying epoxy resin A) has an epoxy equivalent of between 250 and 10,000 and is a condensation product of a) 50 to 80, preferably 55 to 70 % by weight of an epoxy compound containing at least two epoxy groups per molecule and having an epoxy equivalent of 100 to 2,000, b) 35 to 17, preferably 35 to 20 % by weight of an aromatic polyol and c) 15 to 3, preferably 9 to 4, % by weight of a condensation product of an aliphatic polyol with a mean molecular weight ($\overline{M}w$) of 200 to 20,000, an epoxy compound containing at least two epoxy groups per molecule and having an epoxy equivalent of 100 to 2,000, and of a mono- and/or polyisocyanate, the equivalent ratio of the OH groups to the epoxy groups being 1:0.85 to 1:3.5, the quantity of mono- and/or polyisocyanate being 0.05 to 5% by weight, referred to the quantity of aliphatic polyol and epoxy compound, and the epoxy equivalent of said condensation product being between 200 and at least 50,000.

The invention further relates to a process for the preparation of said epoxy resin dispersions, wherein the self-emulsifying epoxy resin A) is first prepared by condensation of the three components A(a), A(b) and A(c) at elevated temperatures in the presence of a condensation catalyst and optionally of organic solvents C), optionally further organic solvents C) are subsequently added and then appropriate quantities of water and also optionally the compounds corresponding to D) are added at 30° to 100° C. with vigorous stirring to the solution so obtained.

Finally, the invention also has as subject the use of said epoxy resin dispersions for the preparation of painting materials, coatings, molding compounds and thermosetting materials.

The self-emulsifying epoxy resin corresponding to A) of the dispersion according to the invention has preferably an epoxy equivalent of 350 to 2,500, in particular of 450 to 1,500. The mean particle size of the dispersed resin is, as a rule, not greater than 1.0 μm and is preferably 0.3 to 1.0 μm, and especially 0.3 to 0.8 μm. The proportion of said resin in the total dispersion is in general about 20 to 70% by weight, preferably 25 to 55% by weight. The term "self-emulsifying" shall mean that no external emulsifiers are necessary to keep the self-emulsifying resin in stable dispersion due to increments in the molecular chain which act as internal emulsifiers.

The 1,2-epoxy compounds corresponding to A(a) and A(c) are polyepoxides with on average at least two epoxy groups per molecule. Said epoxy compounds may, at the same time be both saturated and also unsaturated, and also aliphatic, cycloaliphatic, aromatic or heterocyclic and may also contain hydroxyl groups. They may furthermore contain those substituents which, under the mixing or reaction conditions, cause no interfering side reactions, for example alkyl or aryl substituents, ether groupings and the like.

Preferably, these epoxy compounds are polyglycidyl ethers based on polyhydric, preferably dihydric alcohols, phenols, hydrogenation products of said phenols and/or novolaks (reaction products of mono- or dihydric phenols with aldehyde, in particular formaldehyde, in the presence of acidic catalysts). The epoxy equivalents of said epoxy compounds are preferably between 160 and 500, in particular between 170 and 250. As polyhydric phenols, mention may be made, for example, of: resorcin, hydroquinone, 2,2-bis(4-hydroxyphenyl)-propane (bisphenol A), isomeric mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxydiphenyl, 4,4'-dihydroxybenzophenol, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, tris(4-hydroxyphenyl)methane, bis(4-hydroxyphenyl) ether, bis(4-hydroxyphenyl)ulfone etc., and also the chlorination and bromination products of the abovementioned compounds. Bisphenol A is particularly preferred in this connection.

The polyglycidyl ethers of polyhydric alcohols are also suitable. As examples of such polyhydric alcohols, mention may be made of ethylene glycol, diethylene glycol, triethylene glycol, 1,2-propylene glycol, polyoxypropylene glycols (n=1-10), 1,3-propylene glycol, 1,4-butylene glycol, 1,5-pentanediol, 1,6-hexanediol, 1,2,6-hexanetriol, glycerol and bis(4-hydroxycyclohexyl)-2,2-propane.

It is also possible to use polyglycidyl esters of polycarboxylic acids which are obtained by a reaction of epichlorohydrin or similar epoxy compounds wich an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedecarboxylic acid and dimerised linolenic acid. Examples are diglycidyl adipate, diglycidyl phthalate and diglycidyl hexahydrophthalate.

A detailed enumeration of the suitable epoxy compounds is to be found in the handbook entitled "Epoxidverbindungen und Epoxidharze [Epoxy Compounds and Epoxy Resins]" by A.M. Paquin, Springer Verlag, Berlin 1958, chapter IV, and in Lee and Neville "Handbook of Epoxy Resins", 1967, chapter 2. Mixtures of several epoxy compounds may also be used.

The aromatic rings containing OH groups are preferable as aromatic polyols corresponding to A(b) as described in the case of the components A(a) and A(c), i.e., for example, polyhydric, preferably dihydric, phenols, their chlorination or bromination products, and/or novalaks. The OH groups are preferably bound directly to the aromatic ring. Here, too, bisphenol A is also particularly preferred.

The aliphatic polyols of component A(c) are preferably polyether polyols (polyalkylene glycols) having mean molecular weights ($\overline{Mw}$; gel permeation chromatography; polystyrene standard) of preferably 600 to 12,000, in particular 2,000 to 8,000, and OH numbers expediently of 10 to 200, preferably 15 to 16. Said polyether polyols have preferably only terminal, primary OH groups. For example, mention may be made here of block copolymers of ethylene oxide and propylene oxide, and also of polyethylene, polypropylene and polybutylene glycols, it also being possible to employ mixtures of the respective polyalkylene glycols. Preferably, polyethylene glycols are used.

In the case of the condensation product Ac), the equivalent ratio of the OH groups to the epoxy groups is preferably either c1) 1:0.85 to 1:1.5, in particular 1:0.95 to 1:1.20 and the epoxy equivalent at least 100,000, preferably 100,000 to 400,000, or c2) the equivalent ratio is 1:1.8 to 1:3.5, in particular 1:2.0 to 1:2.6 and the epoxy equivalent between 400 and 10,000.

Said condensation product A(c) may be obtained, for example, by condensation of the said polyether polyols with the polyglycidyl ethers in the presence of, for example, the following specific c1) catalysts at elevated temperature, in particular at 50 to 200, preferably 90° to 150° C.: Boron trifluoride and its complexes, for example with water, phosphoric acid, acetic acid (1:1 and 1:2), methanol, diethyl ether, tetrahydrofuran, phenol, tricresyl phosphate, ethylene glycol monoethyl ether, polyethylene glycol (MW 200) dimethyl sulfoxide, di-n-butylether, di-n-hexyl ether and succinic acid or tetrafluoroboric acid in aqueous or organic solution. Lewis acids with different bases, such as $SnCl_4$, are, however, also suitable. Of these catalysts, $BF_3$-diethyl ether, $BF_3$-acetic acid and tetrafluoroboric acid are preferably employed. The quantity of catalyst is in general 0.1 to 5, preferably 0.15 to 1 % by weight, referred to the reaction mixture. To improve the dosing, the catalyst may be diluted in a solvent such as diethyl ether, a glycol ether or cyclic ether, ketones or the like, preferably dioxane or methyl isobutyl ketone in an amount of up to 0.5 to 20, preferably 2.5 to 12.5 % by weight.

In this connection, the two components are employed in quantities such that the equivalent ratio of OH groups to the epoxy groups is in general 1:0.85 to 1:1.15, preferably 1:0.95 to 1:1.20.

Preferred condensation products (dispersants) A(c) are those of the epoxy compounds described above, in particular polyglycidyl ethers of bisphenols, with aliphatic polyols, the epoxy equivalent of said condensation products being, if the catalysts c1) are used, at least 50,000, preferably 100,000, and in particular between 100,000 and 400,000.

If $BF_3$ in the form of more stable complexes ($\rightarrow c_2$), for example complexed with amines, isused as specific catalysts, the two components are used to prepare the condensation products A(c) expediently in quantities such that the equivalent ratio of OH groups to epoxy groups is 1:1.8 to 1:3.5, preferably 1:2.0 to 1:2.6. Suitable catalysts for this procedure are $BF_3$-amine complexes which are soluble in the reaction mixture and in which the amine forming the complex has a $pK_3$-value in aqueous solution of 15 to 4.5. Suitable $BF_3$-amine complexes are, for example, those which are formed from the following amines (pK$_b$ values in brackets) and BF$_3$: n-amylamine (10.63), aniline (4.63), β-phenylalanine=2-amino ethyl benzene (9.84), 2-ethylbenzimidazole (6.18), benzylamine (9.33), transbornylamine (10.17), 1-amino-3-methylbutane (10.60), 1.4-diaminobutane (11.15), n-butylamine (10.77), tert-butylamine (10.83), n-butylcyclohexylamine (11.23), cyclohexylamine (10.66), n-decylamine (10.64), diethylamine (10.49), diisobutylamine (10.91), diisopropylamine (10.96), dimethylamine (10.73), n-docecanamine=laurylamine (10.63), 2-aminoethanol (9.50), ethylamine 10.81), hexadecanamine (10.63), 1-aminoheptene (10.66), 2-aminoheptane (10.88), n exylamine (10.56), 2,4-dimethylimidazole (8.36), morpholine (8.33), methylamine (10.66), n-nonylamine (10.64), octadecamine (10.60), octylamine (10.65), 3-aminopentane (10.59), 3-amino-3-methylpentane (11.01), n-pentadecylamine (10.61), piperazine (9.83), propylamine (10.71), pyrrolidine (11.27), tetradecanamine =myristylamine (10.62), tridecanamine (10.63), triethylamine (11.01), trimethylamine (9.81).

Preferably, BF$_3$-benzylamine, BF$_3$-monoethylamine, BF$_3$-propylamine and BF$_3$-n-butylamine are employed. Very suitable, however, are also BF$_3$-amine complexes converted to a liquid form by modification such as are marketed, for example, by Anchor Chemical Ltd. (Manchester) under the description "Anchor" 1040 (containing 15-16 % BF3) or "Anchor" 1171 (containing 11-12 % BF$_3$).

The reaction of the hydroxyl groups with the epoxy groups can be carried out in the temperature range from 20° to 200° C. The reaction temperature is dependent on the BF$_3$-amine complex concerned. For example, if BF$_3$-monoethyl amine or BF$_3$-benzylamine is used, the reaction temperature is 130° to 140° C., and if a liquefied amine complex is used, it is around 170° C. The mixtures of compounds containing hydroxyl groups and epoxy groups which are to be reacted are therefore expediently heated to that temperature at which the reaction proceeds at an adequate rate, i.e. in 30 minutes to 15 hours. The reaction is expediently tracked by means of the increase in the epoxy equivalent, which indicates a reduction in the epoxy groups. The reaction can be terminated by cooling below the reaction temperature. A portion of the BF$_3$-amine complex is used up during the reaction by incorporation of the fluoride ions in the reaction product. Any excess of the BF$_3$-amine complex can be rendered harmless after termination of the reaction by adding substances with a basic activity such as bleaching earth, calcium oxide, calcium hydroxide, barium oxide and barium hydroxide to the complex in excess. The substances with basic activity are removed together with the products produced from them and the BF$_3$-amine complexes by filtration.

The quantity of these catalysts c$_2$) is in general also 0.1 to 5, preferably 0.15 to 1 % by weight, referred to the reaction mixture. To improve the dosing, the catalyst may be diluted in a suitable solvent in an amount of up to 0.5 to 10, preferably 2.5 to 12.5 % by weight. Preferred condensation products (dispersants) A(c) produced using the said catalysts c$_2$) are those of the epoxy compounds described above, in particular polyglycidyl ethers of bisphenols, with aliphatic polyols, the epoxy equivalent of said condensation products being between 200 and 120,000, preferably 400 and 10,000.

Suitable monoisocyanates for preparing the component Ac) are, for example, those which essentially contain only one isocyanate group, such as methyl isocyanate, ethyl isocyanate, the propyl isocyanates, the butyl isocyanates, n-dodecyl isocyanate, phenyl isocyanate, α-naphthyl isocyanate and the like. In addition, mention may also be made here of partially masked polyisocyanates still containing a free NCO group. The compounds mentioned below are suitable as polyisocyanates. The masking agents are preferably aliphatic, cycloaliphatic or alkylaromatic monohydric alcohols, for example lower aliphatic alcohols such as methyl and ethyl alcohol, the various propyl, butyl and hexyl alcohols, heptyl, octyl, nonyl, decyl and dodecyl alcohol and the like; methoxy-(1-or 2-)propanol; furthermore, unsaturated alcohols such as allyl alcohol and propargol alcohol cycloaliphatic alcohols such as cyclopentanol, cyclohexanol, alkyl aromatic alcohols such as benzyl alcohol, methyl- and also p-methoxy- and p-nitrobenzyl alcohol and monoethers of glycols such as ethylene glycol monomethyl ether, ethylene glycol monoethyl ether, ethylene glycol monobutyl ether or the corresponding monoethers of propylene glycol. At the same time, ethyl glycol, 2-ethylhexanol, butyl diglycol, butyl glycol and benzyl alcohol and, at the same time, in particular the alcohols which form liquid semi-urethanes are preferred.

As poly-, preferably diisocyanates, use may be made of the usual polyisocyanates known in the polyurethane or paint sector, for example aliphatic, cycloaliphatic or aromatic polyisocyanates, typical examples of such polyisocyanates are: tolylene 2,4-diisocyanate and also its technical mixtures with tolylene 2,6-diisocyanate, tolylene 2,6-diisocyanate, diphenylmethane 4,4'-diisocyanate, hexamethylene 1,6-diisocyanate, naphthalene 1,5-diisocyanate, m-xylene diisocyanate, 1-methyl-2,4-diisocyanatocyclohexane, isophoronediisocyanate, 2,4,4-trimethyl-1,6-diisocyanatohexane, dimeric tolylene 2,4-diisocyanate, N,N'-di(4-methyl-3-isocyanatophenyl)urea, N,N'N''-tri((6-isocyanatohexyl)biuret, triphenylmethane 4,4',4''-triisocyanate, the reaction product of 3 moles of tolylene 2,4-diisocyanate and 1 mole of 1,1,1-trimethylolpropane, tri- and polymerization products of tolylene 2,4-diisocyanate, cotrimerization and copolymerization products of tolylene 2,4-diisocyanate and hexamethylene 1,6-diisocyanate, mixtures of isomeric diphenylmethane isocyanates, polyisocyanates containing more than two benzene nuclei linked in each case via methane groups and diisocyanates with diphenylmethane structure, whose isocyanate groups have been partly converted into carbodiimide groups.

Preferably, phenyl isocyanate, the isomers, or their mixtures, of tolylene diisocyanate, isophorone diisocyanate and the isomers, or their mixtures, of trimethylhexamethylene diisocyanate are used as isocyanates.

The reaction with the isocyanates mentioned may be carried out in the temperature range from 50° to 140° C., preferably 110° to 135° C. in a period of 15 to 400 min., preferably 30 to 60 minutes, optionally in the presence of solvents which are inert towards isocyanates and of catalysts. In the case of poly(di)isocyanates care should also be taken at the same time to ensure that no gelling takes place by choosing suitable reaction conditions, in particular the quantitative ratios.

Solvents which are inert towards isocyanates and which are removed after completion of the reaction, optionally by distillation, are, for example esters such as ethyl acetate, butyl acetate, methyl glycol acetate and ethyl glycol acetate, ketones such as methyl ethyl ketone, methyl isobutyl ketone, aromatics such as toluene, xylene and mixtures of higher aromatics and also mixtures of the solvents mentioned. Toluene and xylene are preferred.

The abovementioned catalysts are the catalysts usual in isocyanate chemistry such as, for example, tertiary amines and/or compounds of di- and tetravalent tin such as diazobicyclooctane (DABCO), tin(II) octoate, dibutyltin oxide, dibutyltin dioctoate, dibutyltin dilaurate etc. In this connection, dibutyltin dilaurate is preferred.

The quantity of isocyanate is in general 0.05 to 5% by weight, preferably 0.1 to 2.5% by weight and, in particular, 0.1 to 1.0% by weight, referred to aliphatic polyol and epoxy compound in Ac). In the presence of catalysts and if poly(di)isocyanates are used, lower quantities can be used in this connection than if catalyst are not employed or if monoisocyanates are used. In this case, the isocyanate reacts with the OH groups of the reaction product of aliphatic polyol and epoxy compound (which may optionally already contain OH groups) and also possibly with the epoxy groups which are still present in said reaction product. In this connection, care should be taken that, after the reaction with the isocyanate in Ac), an adequate number of reactive groups (OH and/or epoxy groups) is still present to make a reaction with Aa) and Ab) possible.

The quantity of condensation product A(c) in the self-emulsifying epoxy resin is in general about 3 to 15 % by weight, preferably 4 to 9 % by weight, referred to the self-emulsifying epoxy resin.

The quantity of water in the dispersion according to the invention is expediently about 30 to 55 % by weight, preferably about 35 to 50 % by weight, referred to the total dispersion.

Suitable organic solvents corresponding to the component C) of the dispersion according to the invention are, in particular, ethylene glycol mono- or diethers, propylene glycol mono- or diethers, butylene glycol mono- or diethers of monoalcohols with an optionally branched alkyl radical containing 1 to 6 carbon atoms, aliphatic alcohols with optionally branched alkyl radicals containing 1 to 12 carbon atoms, araliphatic and cycloaliphatic alcohols such as benzyl alcohol or cyclohexanol, aromatic compounds such as xylene, or ketones such as methyl isobutyl ketones, it being possible to employ said solvents individually or as mixtures. The boiling point of said solvents is preferably not above 210° C. Preferred in this connection are ethyl glycol, methyl glycol, methoxypropanol, ethoxypropanol and/or benzyl alcohol. The epoxy resin dispersion according to the invention preferably contains about 2 to 15, in particular about 4 to 10 % by weight of said organic solvents.

As normal additives in the sense of D), which may optionally be present in the combination according to the invention, mention may be made here, for example, of the normal lacquer additives such as pigments, pigment pastes, antioxidants, leveling or thickening agents, defoaming agents and/or wetting agents, reactive diluents, fillers, catalysts and the like. These additives, which also include hardeners and other thermosetting resins, may be added to the dispersion optionally only immediately prior to processing.

As hardeners for the self-emulsifying epoxy resins of the invention, the hardeners or hardening compounds (epoxy hardeners) known for this purpose, such as basic hardeners, (amine hardeners), for example polyamines, Mannich bases, adducts of amines on polymers such as polyepoxides and polyamidoamines, may be employed Furthermore, acidic hardeners (acid hardeners) such as polycarboxylic acids and their anhydrides, and also polyhydric phenols may be employed. Synthetic resins containing hydroxyl and/or amino groups, such as amine or phenolic resins, are also suitable for this purpose.

Examples of basic hardeners, preferably for hardening at room temperature or lower temperatures (amine cold hardeners), which are in general employed in the epoxide equivalent:amine hydrogen equivalent ratio of 1:(0.75 to 1.5), are polyalkylene amines such as diethylenetriamine, triethylenetetramine, tetra-ethylenepentamine, etc., and also 2,2,4- and/or 2,4,4-trimethylhexamethylenediamine, bis(3-aminopropyl)methylamine, 1,4-bis(3-aminopropyl)piperazine, N,N-bis(3-aminopropyl)ethylenediamine and also cycloaliphatic amines such as 1,2- or 1,3-diaminocyclohexane, 1,4-diamino-3,6-diethylcyclohexane, 1,2-diamino-4-ethylcyclohexane, 1,4-diamino-3,6-diethylcyclo-hexane, 1,cyclohexyl-3,4-diamino-cyclohexane, isophoronediamine, 4,4'-diaminodicyclohexylmethane, 4,4'-diaminodicyclohexylpropane, 2,2-bis(4-aminocyclohexyl)propane, 3,3'-dimethyl-4,4'-diamino-dicyclohexylmethane, 3-amino-1-cyclohexaneaminopropane, 1,3- and 1,4-bis(aminomethyl)cyclohexane.

As araliphatic amines, in particular those amines are employed in which the amino groups are present on the aliphatic radical for example m- and p-xylylenediamine or their hydrogenation products. The amines may be used alone or as mixtures.

Suitable Mannich bases are prepared by condensation of polyamines, preferably diethylenetriamine, triethylenetetramine, isophoronediamine, 2,2,4- or 2,4,4-trimethylhexamethylenediamine, 1,3- and 1,4-bis(aminomethyl)cyclohexane, in particular m- and p-xylylenediamine, with aldehydes, preferably formaldehyde and mono- or dihydric phenols containing at least one aldehyde-reactive nuclear position, for example the various cresols or xylenols, p-tert-butylphenol, resorcin, 4,4'-dihydroxydiphenylmethane, 4,4'-dihydroxydiphenyl-2,2-propane, preferably, however, phenol.

Suitable amine-epoxide adducts are, for example, reaction products of diamines such as, for example, ethylenediamine, propylenediamine, hexamethylenediamine, 2,2,4-, 2,4,4-trimethylhexamethylenediamine, m-xylylenediamine and/or bis(aminomethyl)cyclohexane with terminal epoxides such as, for example, propylene oxide, hexene oxide or with glycidyl ethers such as phenyl glycidyl ether, ethylhexyl glycidyl ether, butyl glycidyl ether or with glycidyl esters such as "Cardura E", or polyglycidyl ethers or esters such as are described under A(a) or A(c).

Polyamidoamines which can be used for the present purposes are obtained, for example by reacting polyamines with polycarboxylic acids such as dimerised fatty acids.

In addition to the above polyamines, the water-soluble polyoxypropylenediamines with molecular weights of 190 to 2,000 and also the readily water-dispersible hardeners, such as are described in the German Auslegeschrift 2,332,177 and the European Patent 0,000,605, i.e., for example, modified amine adducts, are preferably employed as amine hardeners. To complete the full curing, the coatings obtainable from these dispersions may also be heated for 30 to 120 minutes at 50° to 120° C.

Suitable acidic hardeners, which are usually used in an epoxy: carboxyl equivalent ratio of 1:(0.75 to 1.5) are water soluble polycarboxylic acids, for example cyclopentanetetracarboxylic acid, in particular butanetetracarboxylic acids such as cyclobutanetetracarboxylic acid, preferably 1,2,3,4-butanetetracarboxylic acid, and also aconitic acid, citric acid or optionally anhydrides or acid esters of said acids with polyhydric alcohols containing 2 to 12, preferably 2 to 6 carbon atoms such as neopentyl glycol, glycerol, trimethylolethane or -propane, the alkane diols and their oligomers, which optionally contain one or more ether bridges, such as ethylene glycol, propane- and butanediols, the esters always having at least 3 free COOH groups. It is also possible to use acid esters containing three or more COOH groups of pyromellitic acid, trimellitic acid, phthalic acid, endomethylenetetra-or-hexahydrophthalic acid, maleic acid, fumaric acid or their anhydrides, insofar as they exist, with polyhydric alcohols, for example those mentioned above, as polycarboxylic acid hardeners, insofar as said acidic esters have an adequate water solubility or water dilutability. In this connection it should be noted that dibasic carboxylic acids are reacted with at least trihydric alcohols or dihydric alcohols with at least tribasic acids in order to achieve an adequate number of COOH groups in the acidic esters.

Instead of or in addition to the hardeners described above, amine and/or phenolic resins in quantities of 5 to 50% by weight, preferably 10 to 35 % by weight, referred to the total solids content, may also be used for curing. Optionally, water is also additionally added to the dispersion at the same time so that the total solids content is adjusted to 10 to 80 % by weight. Examples of such amine resins are aminealdehyde resins, i.e. condensation products of aldehydes with melamine (melamine resins), urea (urea resins), acetoguanamine (acetoguanamine resins) or similar compounds or corresponding precondensates. Preferred aldehyde condensation products of melamine are, in particular, the melamine methylol alkyl ethers, the alkyl radicals being composed of methyl, n- or i-butyl groups preferably methyl groups, such as hexamethoxymethylmelamine, ethoxymethoxymethylmelamine, monomethylolpentamethoxymethylenemelamine, dimethyloltetramethoxymethylenemelamine, trimethyloltrimethoxymethylenemelamine and the like, with substantially monomeric structure, and also corresponding oligomers or polymeric products.

As phenolic resin hardeners mention may be made of resols, formaldehyde phenolcarboxylic acid resins and phenolic resin intermediates, the commercial etherified, waterdilutable phenolic resin resols being preferred. Optionally, acidic catalysts such as p-toluene sulfonic acid, cyclohexanesulfamine acid, acidic butylphosphate and phosphoric acid - optionally also as (amine) salts - may also be added to the dispersions containing phenolic and/ or amine resin in order to increase the rate of the curing reaction so that films or coatings are produced which cure at fairly low temperature or in a fairly short time. The quantity of said acid catalysts is, for example, up to 2% by weight, referred to the total solids content.

Additional hardenable resins in the sense of the component D) are, for example, resins dispersible in aqueous media based on hydroxyalkyl acrylates, hydroxyalkydes, polyesters, epoxy resins and the like. The proportion of said additional resins may, for example, be so dimensioned that the total solids content of the mixture is about 10 to 80, preferably 20 to 40 % by weight. By adding such resins the properties of the products prepared from the dispersions can be influenced in a desired manner. Thus, for example, it is possible to improve the resistance to yellowing of the coatings prepared therefrom by the presence of acylate resins and the elasticity by adding alkyd resins.

The total solids content of the epoxy resin dispersion according to the invention may be between about 10 and 80% by weight and is expediently 35 to 70% by weight, preferably 45 to 60 % by weight; its viscosity is in general between 300 and 30,000 mPa.s, preferably between 1,000 and 7,000 mPa.s (20° C.). The epoxy resin dispersion according to the invention is remarkable, in particular, for its good shelf life, due mainly to the low mean particle size of the self-emuslifying epoxy resin with a content of organic solvents which is also low. The coatings obtainable with this dispersion have, in addition, a reduced sensitivity to water, with improved hardness.

In the process according to the invention for the preparation of said epoxy resin dispersions, the self-emulsifying epoxy resin A) is first prepared by condensation of the three components A(a), A(b) and A(c) at elevated temperatures, in general 120° to 220° C., preferably 150° to 180° C., in the presence of a condensation catalyst. Suitable as the latter are, for example, phosphines such as triphenylphosphine, phosphonium salts such as, for example, benzyltrimethylphosphonium chloride, tertiary amines such as, for example, benzyldimethylamine, quaternary ammonium salts such as, for example, tetramethylammonium chloride, alkali-metal hydroxides such as NaOH, LiOH, alkali-metal carbonates such as sodium carbonate, lithium carbonate, alkali-metal salts of organic acids such as sodium formate and lithium benzoate. The organic solvent C) may also be already fully or partially present during this condensation.

Subsequently the organic solvent (insofar as the condensation has not already taken place in the presence of the total quantity of the organic solvent) is added to said resin at temperatures of 120° C. to 220° C., preferably 100° to 160° C. and a solution is produced. Then the appropriate quantity of water is added while stirring vigorously at temperatures of 30° to 100° C., preferably 55° to 85° C., as a result of which the aqueous dispersion is produced. This dispersion is expediently carried out using a fast-running paddle stirrer, a colloid mill, a homogenizer or another fast mixer with high shearing force, for example a dissolver.

The compounds corresponding to D (additives, hardeners, other thermosetting resins) are preferably added only immediately before the dispersion is used.

The dispersions according to the invention are suitable in conjunction with suitable hardeners mainly for preparing coatings and/or intermediate coatings for the most diverse fields of application, in particular as protective coatings on rough and porous substrates. They are further suitable for chemical- and weathering-resistant coatings and linings of objects.

Owing to their beneficial properties, the dispersions according to the invention are also outstandingly suitable for single-layer lacquering. The adhesive coating layer may remain unaltered, but it may also serve as an intermediate layer, i.e. as a base for further coatings, which may in turn be composed of the same or a different normal coating material.

Because of their good dilutability and their other beneficial properties, the dispersions according to the invention are also suitable for additional use in electrophoretic painting.

A further possibility is their use for water-dilutable adhesives. They may also be employed as binders for textiles, and organic and/or inorganic materials. They are also suitable for use as thermosetting molding compounds. In addition, they can also serve as an additive for synthetic cements.

In the event of being used as a coating agent (or as a predominantly aqueous lacquer, the deposition on the substrate such as metal, wood, glass, concrete, plastic, ceramic etc., is carried out by conventional methods such as brushing, spraying, dipping or rolling on. Insofar as no hardener is also used for cold curing, the coatings are cured by heating to 100° to 250° C. for a time sufficient for curing, in general about five minutes to one hour.

In the experiments and examples below, % means in all cases percent by weight. The viscosity was always measured at ambient temperature with a Brookfield viscometer.

EXAMPLES

I. Preparation of the condensation products (dispersants) A(c) with catalyst c1)

In all the examples 1 to 11, the reaction mixture was heated to 130° C. after adding the $BF_3$ compound and kept at this temperature until the reaction had finished, which was indicated by an increase in the epoxy equivalent to the specified value in each case.

1) 309 g of technical polyethylene glycol having a mean molecular weight of 4,000 and 32.5 g of a polyglycidyl ether based on bisphenol A having an epoxy equivalent of 185 were heated together to 100° C. and 0.5 ml of $HBF_4$, 50 % solution in $H_2O$, diluted with 10 ml of methylisobutyl ketone, was added while stirring. The OH/epoxy equivalent ratio was 1;1.15, the epoxy equivalent of the condensate was approx. 350,000. The methyl isobutyl ketone was removed under vacuum.

2) A solution of 2.85 g of tolylene diisocyanate (TDI 80=80% 2,4-, 20% 2,6-isomer) dissolved in 10 ml of dried xylene was added to 285 g of the condensate according to Example 1 at 130° C. in approx. 30 min. After a holding time of 60 minutes at 130° C., the xylene was removed in vacuo. In a 50% by weight solution in benzyl alcohol, the condensate had a viscosity of 12,170 mPa.s (25° C.).

3) 1.42 g of TDI-80 dissolved in 10 ml of dried xylene were added to 284 g of the condensate according to Example 1 at 130° C. in approx. 30 min. After a holding time of 60 minutes at 130° C., the xylene was removed in vacuo. In a 50% by weight solution in benzyl alcohol, the condensate had a viscosity of 8,120 mPa.s (25° C.).

4) 0.7 g of TDI-80 dissolved in 10 ml of dried xylene was added at 130° C. in 30 min to 280 g of a condensate corresponding to Example 1 which, in a 50% by weight solution in benzyl alcohol, had a viscosity of 5,530 mPa.s (25° C.). After a holding time of 60 minutes at 130° C., the xylene was removed in vacuo. In a 50% by weight solution in benzyl alcohol, the condensate had a viscosity of 9,000 mPa.s (25° C.).

5) 2.81 g of phenyl isocyanate dissolved in 10 ml of dried xylene were added at 130° C. in 30 min to 281 g of a condensate corresponding to Example 1 which, in a 50% by weight solution in benzyl alcohol, had a viscosity of 5,530 mPa.s (25° C.). After a holding time of 60 minutes at 130° C., the xylene was removed in vacuo. In a 50% by weight solution in benzyl alcohol, the condensate had a viscosity of 5,500 mPa.s (25° C.).

6) At 130° C., 0.5 ml of a 1% solution of dibutyltin dilaurate in xylene and then, in 30 min, 1.23 g of TDI-80 dissolved in 15 ml of dried xylene were added to 247 g of a condensate corresponding to Example 1 which, in a 50% by weight solution in benzyl alcohol, had a viscosity of 5,530 mPa.s (25° C.). After a holding time of 60 minutes at 130° C., the xylene was removed in vacuo. In a 50% by weight solution in benzyl alcohol, the condensate had a viscosity of 7,680 mPa.s (25° C.).

7) At 130° C., 0.5 ml of a 1% solution of dibutyltin dilaurate in xylene and then, in 30 min., 1.15 g of isophorone diisocyanate dissolved in 15 ml of dried xylene were added to 231 g of a condensate corresponding to Example 1 which, in a 50% by weight solution in benzyl alcohol, had a viscosity of 4,750 mPa.s (25° C.). After a holding time of 60 minutes at 130° C., the xylene was removed in vacuo. In a 50% solution in benzyl alcohol, the condensate had a viscosity of 5,730 mPa.s (25° C.).

8) At 130° C., 0.5 ml of 1% solution of dibutyltin dilaurate in xylene and then, in 30 min, 1.30 g of trimethylhexamethylene diisocyanate (2,2,4- and 2,4,4-isomer mixture) dissolved in 15 ml of dried xylene were added to 259 g of a condensate corresponding to Example 1 which, in a 50% by weight solution in benzyl alcohol, had a viscosity of 5,530 mPa.s (25° C.). After a holding time of 60 minutes at 130° C., the xylene was removed in vacuo. In a 50% by weight solution in benzyl alcohol, the condensate had a viscosity of 7,160 mPa.s (25° C.).

9) At 130° C., 1.0 ml of a 1% solution of dibutyltin dilaurate in xylene and then, in 30 min, 2.6g of phenylisocyanate dissolved in 20 ml of dried xylene were added to 259 g of a condensate corresponding to Example 1 which, in a 50% by weight solution in benzyl alcohol, had a viscosity of 4,750 mPa.s (25° C.). After a holding time of 60 minutes at 130° C., the xylene was removed in vacuo. In a 50% by weight solution in benzyl alcohol, the condensate had a viscosity of 4,850 mPa.s (25° C.).

10) At 130° C., 105 ml of a 1% solution of dibutyltin dilaurate in xylene and then, in 30 min, 3.78 g of phenyl isocyanate dissolved in 15 ml of dry xylene were added to 185 g of a condensate corresponding to Example 1 which, in a 50% by weight solution in benzyl alcohol, had a viscosity of 5,530 mPa.s (25° C.). After a holding time of 60 minutes at 130° C., the xylene was removed in vacuo. In a 50% by weight solution in benzyl alcohol, the condensate had a viscosity of 4,240 mPa.s (25° C.).

11) 250 g of TDI-80 were heated to 60° C. while stirring under a dried $N_2$ atmosphere. 3 ml of a 1% dibutyltin dilaurate solution in xylene were added. 129.5 g of dried ethyl glycol were added in 120 min. The solution was then held for a further 120 min at 60° C. until the NCO content of this semi-urethane was 15 to 16% by weight.

12) At 130° C., 0.5 ml of a 1% solution of dibutyltin dilaurate in xylene and then, in 30 min, 4.42 g of the above semi-urethane dissolved in 20 ml of dried xylene were added to 220 g of a condensate corresponding to Example 1 which, in a 50% by weight solution in benzyl alcohol, had a viscosity of 4,490 mPa.s (25° C.). After a holding time of 60 minutes at 130° C., the xylene was removed in vacuo. In a 50% by weight solution in benzyl alcohol, the condensate had a viscosity of 5,130 mPa.s (25° C.).

II. Preparation of the condensation products (dispersants) A(c) using the catalysts mentioned under $c_2$).

1) 500 g of a polyethylene glycol having a mean molecular weight of 4,000 and 115.5 g of a polyglycidyl ether based on bisphenol A having an epoxy equivalent of 185 were heated together to 120° C. 2 g of the BF$_3$-amine complex "Anchor" 1040 were added and heated to 170° C. The epoxy equivalent was checked. A further 0.85 g of the amine complex "Anchor" 1040 was added in three batches. After the epoxy equivalent of 1,940, which signifies a 20% higher condensation of the coreactant than is equivalent to the reaction of the hydroxyl groups of the polyethylene glycol, had been reached, the reaction was terminated. The OH/epoxy equivalent ratio was 1:2.5.

2) 500 g of a polyethylene glycol having a mean molecular weight of 4,000 and 92.5 g of a polyglycidyl ether based on bisphenol A having an epoxy equivalent of 185 were heated together to 120° C. 2 g of BF$_3$-monoethylamine were added and heated to 150° C. The epoxy equivalent was checked. After the epoxy equivalent of 3,140, which signifies a 25 % higher condensation of the coreactant than is equivalent to the reaction of the hydroxyl groups of the polyethylene glycol, had been reached, the reaction was terminated. The OH-/epoxy equivalent ratio was 1:2.0.

3) At 130° C., 1.0 ml of a 1% solution of dibutyltin dilaurate in xylene and then, in 30 min, 6.25 g of TDI-80 dissolved in 40 ml of dried xylene were added to 250 g of a condensate corresponding to the above Example 1. After a holding time of 60 min at 130° C., the xylene was removed in vacuo. In a 50% by weight solution in benzyl alcohol, the condensate had a viscosity of 3,750 mPa.s (25° C.) and an epoxy equivalent of 3,750.

4) 250 g of isophorone diisocyanate dissolved in 20 ml of dried xylene were added at 130° C. in 30 min to 250 g of a condensate corresponding to the above Example 2 which had an epoxy equivalent of 2,400. After a holding time of 60 min at 130° C., the xylene was removed in vacuo. In a 50% by weight solution in benzyl alcohol, the condensate had a visosity of 880 mPa.s (25° C.).

III. Examples of the preparation of the dispersion according to the invention using the condensation products as in the Examples I. 2–11

1) In a 2 l 3-necked flask equipped with thermometer, paddle stirrer, reflux condenser and dropping funnel, 325 g of an epoxy resin based on bisphenol A with an epoxy equivalent of 183 were reacted with 98 g of bisphenol A and 27 g of the dispersant I.2) dissolved in 27 g of benzyl alcohol in the presence of 750 mg of triphenylphosphine at 150° to 170° C. until an epoxy equivalent of 510–530 was reached. Dilution was carried out while cooling with 60 g of methoxypropanol. 85 g of deionized water were added steadily in a time period of 5–30 min at a stirring speed of approx. 800 revolutions per minute and with a reduction of the temperature to 70–60C., an aqueous dispersion being produced which was subsequently diluted further with 163 g of deionized water. The dispersion had a solids content of 53.7 % by weight, a viscosity of 4,000 mPa.s (Brookfield, spindle 2 at 6 rpm) and also a particle size of 0.50 μm.

2) In a 2 l 3-necked flask equipped with thermometer, paddle stirrer, reflux condenser and dropping funnel, 325 g of an epoxy resin based on bisphenol A with an epoxy equivalent of 183 were reacted with 98 g of bisphenol A and 27 g of the dispersant I.2) dissolved in 27 g of benzyl alcohol in the presence of 750 mg triphenylphosphine at 150° to 170° C. until an epoxy equivalent of 520–530 was reached. Dilution was carried out whilst cooling with 60 g of methoxypropanol. 85 g of deionized water were added steadily in a time period of 5–30 min at a stirring speed of approx. 800 revolutions per minute and with a reduction in the temperature to 70°–60C., an aqueous dispersion being produced which was subsequently diluted further with 170 g of deionized water. The dispersion had a solids content of 54.2 % by weight, a viscosity of 5,200 mPa.s (Brookfield, spindle 3 at 6 rpm) and also a particle size of 0.45 μm.

3) In a 2 l three-neck flask equipped with thermometer, paddle stirrer, reflux condenser and dropping funnel, 325 g of an epoxy resin based on bisphenol A with an epoxy equivalent of 183 were reacted with 120 g of bisphenol A and 27 g of the dispersant I.4) dissolved in 27 g of benzyl alcohol in the presence of 700 mg triphenylphosphine at 150° to 170° C. until an epoxy equivalent of 510–530 was reached. Dilution was carried out while cooling with 60 g of methoxypropanol. 85 g of deionized water were added steadily in a time period of 5–30 min at a stirring speed of approx. 800 revolutions per minute and with a reduction in temperature to 70°–60C., an aqueous dispersion being produced which was subsequently diluted further with approx. 215 g of deionized water. The dispersion had a solids content of 54.2 % by weight, a viscosity of 4,900 mPa.s (Brookfield, spindle 3 at 6 rpm) and also a particle size of 0.46 μm.

4) In a 2 l three-necked flask equipped with thermometer, paddle stirrer, reflux condenser and dropping funnel, 325 g of an epoxy resin based on bisphenol A with an epoxy equivalent of 183 were reacted with 120 g of bisphenol A and 27 g of the dispersant I.5) dissolved in 27 g of benzyl alcohol in the presence of 700 mg of triphenylphosphine at 150° to 170° C. until an epoxy equivalent of 510–530 was reached. Dilution was carried out while cooling with 60 g of methoxypropanol. 85 g of deionized water were added steadily in a time period of 5–30 min and at a stirring speed of approx. 800 revolutions per minute and with a reduction in temperature to 70°–60° C., an aqueous dispersion being produced which was subsequently diluted further with approx. 215 g of deionized water. The dispersion had a solids content of 53.2 % by weight, a viscosity of 4,950 mPa.s (Brookfield, spindle 3 at 6 rpm) and also a particle size of 0.50 μm.

5) In a 2 l three-necked flask equipped with thermometer, paddle stirrer, reflux condenser and dropping funnel, 325 g of an epoxy resin based on bisphenol A with an epoxy equivalent of 183 were reacted with 120 g of bisphenol A and 27 g of the dispersant I.6) dissolved in 27 g of benzyl alcohol in the presence of 700 mg of triphenylphosphine at 150° to 170° C. until an epoxy equivalent of 510–530 was reached. Dilution was carried out while cooling with 60 g of methoxypropanol. 85 g of deionized water were added steadily in a time period of 5–30 min at a stirring speed of approx. 800 revolutions per minute and with a reduction in temperature to 70°–60° C., an aqueous dispersion being produced which was subsequently diluted further with approx. 215 g of deionized water. The dispersion had a solids content of 53.3 % by weight, a viscosity of 4,250 mPa.s (Brookfield, spindle 3 at 6 rpm) and also a particle size of 0.45 μm.

6) In a 2 l three-necked flask equipped with thermometer, paddle stirrer, reflux condenser and dropping funnel, 325g of an epoxy resin based on bisphenol A with an epoxy equivalent of 183 were reacted with 120 g of bisphenol A and 27 g of the dispersant I.7) dissolved in 27 g of benzyl alcohol in the presence of 700 mg of triphenylphosphine at 150° to 170° C. until an epoxy equivalent of 510–530 was reached. Dilution was carried out while cooling with 60 g of methoxypropanol. 165 g of deionized water were added steadily in a time period of 5–30 min at a stirring speed of approx. 800 revolutions per minute and with a reduction in temperature to 70°–60° C., an aqueous dispersion being produced which was subsequently diluted further with approx. 215 g of deionized water. The dispersion had a solids content of 52.9 % by weight, a viscosity of 4,500 mPa.s (Brookfield, spindle 3 at 6 rpm) and also a particle size of 0.39 μm.

7) In a 2 l three-necked flask equipped with thermometer, paddle stirrer, reflux condenser and dropping funnel, 325 g of an epoxy resin based on bisphenol A with an epoxy equivalent of 183 were reacted with 120 g of bisphenol A and 27 g of the dispersant I.8) dissolved in 27 g of benzyl alcohol in the presence of 700 mg of triphenylphosphine at 150° to 170° C. until an epoxy equivalent of 520–540 was reached. Dilution was carried out while cooling with 60 g of methoxypropanol. 85 g of deionized water were added steadily in a time period of 5–30 min at a stirring speed of approx. 800 revolutions per minute and with a reduction in temperature to 70°–60° C., an aqueous dispersion being produced which was subsequently diluted further with approx. 215 g of deionized water. The dispersion had a solids content of 54.0 % by weight, a viscosity of 4,700 mPa.s (Brookfield, spindle 3 at 6 rpm) and also a particle size of 0.42 μm.

8) In a 2 l three-necked flask equipped with thermometer, paddle stirrer, reflux condenser and dropping funnel, 325 g of an epoxy resin based on bisphenol A with an epoxy equivalent of 183 were reacted with 120 g of bisphenol A and 27 g of the dispersant I.9) dissolved in 27 g of benzyl alcohol in the presence of 700 mg of triphenylphosphine at 150° to 170° C. until an epoxy equivalent of 520–530 was reached. Dilution was carried out while cooling with 60 g of methoxy propanol. 85 g of deionized water were added steadily in a time period of 5–30 min at a stirring speed of approx. 800 revolutions per minute and with a reduction in temperature to 70°–60° C., an aqueous dispersion being produced which was subsequently diluted further with approx. 215 g of deionized water. The dispersion had a solids content of 53.2% by weight, a viscosity of 4,950 mPa.s (Brookfield, Spindel 3 at 12 rpm) and also a particle size of 0.50 μm.

9) In a 2 l three-necked flask equipped with thermometer, paddle stirrer, reflux condenser and dropping funnel, 325 g of an epoxy resin based on bisphenol A with an epoxy equivalent of 183 were reacted with 120 g of bisphenol A and 27 g of the dispersant I.10) dissolved in 27 g of benzyl alcohol in the presence of 700 mg of triphenyl phosphine at 150° to 170° C. until an epoxy equivalent of 510–530 was reached. Dilution was carried out while cooling with 60 g of methoxypropanol. 85 g of deionized water were steadily added in a time period of 5–30 min at a stirring speed of approx. 800 revolutions per minute and with a reduction in temperature to 70°–60° C., an aqueous dispersion being produced which was subsequently diluted further with approx. 215 g of deionized water. The dispersion had a solids content of 53.2% by weight, a viscosity of 5,000 mPa.s (Brookfield, Spindel 3 at 12 rpm) and also a particle size of 0.44 μm.

11) In a 2 l three-necked flask equipped with thermometer, paddle stirrer, reflux condenser and dropping funnel, 325 g of an epoxy resin based on bisphenol A with an epoxy equivalent of 183 were reacted with 120 g of bisphenol A and 27 g of the dispersant I.4) dissolved in 27 g of benzyl alcohol in the presence of 700 mg of triphenylphosphine at 150° to 170° C. until an epoxy equivalent of 510–530 was reached. Dilution was carried out while cooling with 60 g of methoxypropanol. 85 g of deionized water were added steadily in a time period of 5–30 min at a stirring speed of approx. 800 revolutions per minute and with a reduction in temperature to 70°–60° C., an aqueous dispersion being produced which was subsequently diluted further with approx. 215 g of deionized water. The dispersion had a solids content of 53.1% by weight, a viscosity of 2,575 mPa.s (Brookfield, Spindel 2 at 12 rpm) and also a particle size of 0.53 μm.

IV. Examples of the preparation of the dispersions according to the invention using the condensation products of Examples II.3 to 4

1) In a 2 l three-necked flask equipped with thermometer, paddle stirrer, reflux condenser and dropping funnel, 325 g of an epoxy resin based on bisphenol A with an epoxy equivalent of 183 were reacted with 98 g of bisphenol A and 27 g of the dispersant II.3) dissolved in 27 g of benzyl alcohol in the presence of 600 mg of triphenylphosphine at 150° to 160° C. until an epoxy equivalent of approximately 530 was reached. Dilution was carried out while cooling with 60 g of methoxypropanol. 85 g of deionized water were added and stirred in a time period of 5 min below a temperature of 70° C. at a stirring speed of approx. 800 revolutions per minute, an aqueous dispersion being produced which was subsequently diluted further with approx. 235 g of deionized water. The dispersion had a solids content of 53.0 % by weight, a viscosity of 650 mPa.s (Brookfield, spindle 2 at 30 rpm) and also a particle size of 0.65 μm.

2) In a 2 l three-necked flask equipped with thermometer, paddle stirrer, reflux condenser and dropping funnel, 325 g of an epoxy resin based on bisphenol A with an epoxy equivalent of 183 were reacted with 98 g of bisphenol A and 54 g of the dispersant II.4) dissolved in 54 g of benzyl alcohol in the presence of 600 mg of triphenylphosphine at 150° to 160° C. until an epoxy equivalent of approx. 550 was reached. Dilution was carried out while cooling with 33 g of methoxypropanol. 85 g of deionized water were added and stirred in a time period of 5 min below a temperature of 70° C. at a stirring speed of approx. 800 revolutions per minute, an aqueous dispersion being produced which was subsequently diluted further with approx. 230 g of deionized water. Diluted to a solids content of 52.9 % by weight, the dispersion had a viscosity of 2,900 mPa.s (Brookfield, spindle 2 at 12 rpm) and also a particle size of 0.62 μm.

No solid skin forms on open samples of this dispersion over a time period of several hours. The thickening due to viscosity arising as a result of evaporation at the surface can be homogeneously mixed again.

V. Application engineering tests

A dispersion according to the invention (→Example II.2) and also a dispersion in accordance with the prior art (European Patent No. 81,163) were subjected to a series of application engineering tests. The results are shown in the two tables 1 and 2 below.

TABLE 1

|  | According to the invention (Example III.7) | Comparison (Dispersion according to EP 81,163, Ex. 2) |
| --- | --- | --- |
| Dispersion | 100 parts | 100 parts |
| Hardener acc. to Eur.P.0,000,605, Ex. 5c | 20 parts | 20 parts |
| Dry to the touch (RT) | 45 min | 110 min |
| Tack-free (RT) | 110 min | 180 min |
| Pendulum hardness (24 h) | 75 s | 30 s |
| Pendulum hardness (7 d) | 145 s | 85 s |
| Film clouding after: | 3.5 h | 3.0 h |
| Water-resistance after 24 h storage | 1 | 3 |

1. Dry to the touch: glass beads scattered on the film can no longer be removed with a paintbrush after curing.
2. Tack-free: The glass beads can be removed with a paintbrush after curing.
3. Konig pendulum hardness: DIN 53 157
4. Film clouding: After mixing dispersion and hardener, films are applied every half hour to glass plates in a layer thickness of 200 μm. The appearance of a clouding in the film is the result of the test and also the end of the processing time.
5. Water resistance after 24 h storage at room temp.: Films applied to glass plates with a layer thickness of 200 μm are tested after storing for 24 h in $H_2O$ at room temperature.
Scale: 0 = very good, 5 = poor.

TABLE 2

| (testing of the gloss stability) | | |
| --- | --- | --- |
|  | According to the invention (Example III.7) | Comparison (Dispersion according to EP 81,163, Ex. 2.) |
| Dispersion | 100 parts | 100 parts |
| $TiO_2$ | 35.4 parts | 32.5 parts |
| Hexamethoxymethylmelamine | 0.7 parts | 0.65 parts |
| $H_2O$ | 33 parts | 25 parts |
| Hardener acc. to Eur.P.O,000,605, Ex. 5c | 20.6 parts 20.6 parts | 19.0 parts 19.0 parts |
| Gloss stability* |  |  |
| immediately | 97 | 63 |
| 30 min | 100 | 69 |
| 1 h | 98 | 67 |
| 2 h | 93 | 59 |
| 3 h | 85 | 46 |
| 4 h | 47 | 38 |
| 5 h | 29 | — |

*as specified in DIN 67 530; 60°

We claim:

1. An aqueous dispersion comprising a self-emulsifying epoxy resin A) and water B), wherein the self-emulsifying epoxy resin A) has an epoxy equivalent of between 250 and 10,000 and is a condensation product of
   a) 50 to 80 % by weight of an epoxy compound containing at least two epoxy groups per molecule and having an epoxy equivalent of 100 to 2,000,
   b) 35 to 17 % by weight of an aromatic polyol and
   c) 15 to 3 % by weight of a condensation product of an aliphatic polyol with a mean molecular weight (Mw) of 200 to 20,000, an epoxy compound containing at least two epoxy groups per molecule and having an epoxy equivalent of 100 to 2,000, and of a mono and/or polyisocyanate, the equivalent ratio of the OH groups to the epoxy groups being 1:0.85 to 1:3.5, the quantity of mono- and/or polyisocyanate being 0.05 to 5% by weight, referred to the quantity of aliphatic polyol and epoxy compound, and the epoxy equivalent of said condensation product being between 200 and at least 50,000.

2. An epoxy resin dispersion as claimed in claim 1, wherein the quantity of the self-emulsifying epoxy resin is 30 to 70 % by weight, referred to the total dispersion, and the epoxy equivalent is 450 to 2,500.

3. An epoxy resin dispersion as claimed in claim 1, wherein the epoxy compounds corresponding to A(a) and A(c) are at least one member of the group consisting of polyglycidyl ethers and polyglycidyl esters based on polyhydric, phenols.

4. An epoxy resin dispersion as claimed in claim 3, wherein the polyhydric phenol is bisphenol A.

5. An epoxy resin dispersion as claimed in claim 3, wherein the epoxy compounds have epoxy equivalents of 170 to 1,000.

6. An epoxy resin dispersion as claimed in claim 1, wherein the aromatic polyol corresponding to A(b) is a polyhydric, phenol.

7. An epoxy resin dispersion as claimed in claim 1, wherein the aliphatic polyol corresponding to A(c) is polyalkylene glycol having a molecular weight (Mw) of 600 to 12,000.

8. An epoxy resin dispersion as claimed in claim 1, wherein the quantity of isocyanate is 0.1 to 1.0% by weight, referred to aliphatic polyol and epoxy resin.

9. An epoxy resin dispersion as claimed in claim 1, wherein the quantity of A(c) is 4 to 9 % by weight, referred to the total self-emulsifying epoxy resin.

10. Epoxy resin dispersion as claimed in claim 1, wherein, in the condensation product c), the equivalent ratio of the OH groups to the epoxy groups is either $c_1$) 1:0.85 to 1:1.5 and the epoxy equivalent is at least 100,000 or $c_2$) the equivalent ratio is 1:1.8 to 1:3.5, and the epoxy equivalent is 400 to 10,000.

11. An epoxy resin dispersion as claimed in claim 1, wherein the quantity of B) is 30 to 55 % by weight.

12. An epoxy resin dispersion as claimed in claim 1, wherein it contains up to 15 % by weight, referred to the total dispersion, of organic solvents C).

13. An epoxy resin dispersion as claimed in claim 12, wherein the quantity of C) is 2 to 15 % by weight.

14. An epoxy resin dispersion as claimed in claim 1, wherein ethylene glycol mono- or diethers, propylene glycol mono- or diethers, butylene glycol mono- or diethers of monoalcohols having an unbranched or branched alkyl radical containing 1 to 6 carbon atoms, aliphatic alcohols having unbranched or branched alkyl radicals containing 1 to 12 carbon atoms, araliphatic and cycloaliphatic alcohols, aromatic compounds or ketones are employed individually or as a mixture as organic solvents corresponding to C).

15. An epoxy resin dispersion as claimed in claim 1, wherein it contains additives D) selected from consisting of paint additives, hardeners and other thermosetting resins.

16. An epoxy resin dispersion as claimed in claim 15, characterized in that basic or acidic hardeners serve as hardeners.

17. An epoxy resin dispersion as claimed in claim 16, wherein the basic hardeners are amine hardeners selected group consisting of polyoxypropylene amines, polyglycidyl ether/amine adducts and polyamidoamines, said amine hardeners being used in an epoxy equivalent ratio of 1: (0.75 to 1.5).

18. Epoxy resin dispersion as claimed in claim 15, wherein further amine and/or phenolic resins are employed as D).

19. An epoxy resin dispersion as claimed in claim 1, wherein the mean particle size of the self-emulsifying epoxy resin is 0.3 to 1.0 μm.

20. A process for the preparation of the epoxy resin dispersion as claimed in claim 1 wherein self-emulsifying epoxy resin A) is first prepared by condensation of the three components A(a), A(b) and A(c) at elevated temperature in the presence of a condensation catalyst and then appropriate quantities of water B) and optionally the components corresponding to D) are added at 30° to 100° C. with vigorous stirring to the solution thus obtained in the organic solvent C) and then appropriate amounts of water B) are added at 30° to 100° C.

21. The process as claimed in claim 20, wherein the condensation of A(a), A(b) and A(c) is carried out in the presence of at least one solvent C).

22. The process as claimed in claim 20, wherein at least one further organic solvent C) the resin A) after the condensation.

23. Paint materials, coatings, molding compounds or thermosetting mixtures which contain the aqueous dispersion as claimed in claim 1.

24. An epoxy resin dispersion of claim 1 wherein the aromatic polyol of A(c) is a dihydric phenol.

25. An epoxy resin dispersion of claim 10 wherein the ratio of OH groups to epoxy groups in $c_1$ is 1:0.95 to 1:1.20 and the epoxy equivalent is at least 100,000.

26. An epoxy resin dispersion of claim 10 wherein the ratio of OH grous to epoxy groups in $c_1$ is 1:2.0 to 1.26 and the epoxy equivalent is 400 to 10,000.

27. The process of claim 20 wherein the additives D) are added to the resin after condensation.

* * * * *